(12) United States Patent
Yamakawa et al.

(10) Patent No.: US 12,344,391 B2
(45) Date of Patent: Jul. 1, 2025

(54) ELECTRIC PROPULSION DEVICE

(71) Applicant: Hitachi, Ltd., Tokyo (JP)

(72) Inventors: Hironobu Yamakawa, Tokyo (JP); Kisho Ashida, Tokyo (JP); Yuji Enomoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/746,421

(22) Filed: Jun. 18, 2024

(65) Prior Publication Data

US 2025/0019086 A1  Jan. 16, 2025

(30) Foreign Application Priority Data

Jul. 13, 2023  (JP) .................................. 2023-115359

(51) Int. Cl.
| | |
|---|---|
| *B64D 35/021* | (2024.01) |
| *B64C 11/18* | (2006.01) |
| *B64C 27/467* | (2006.01) |
| *B64C 29/02* | (2006.01) |
| *B64D 27/31* | (2024.01) |
| *B64D 27/32* | (2024.01) |

(Continued)

(52) U.S. Cl.
CPC ............ *B64D 35/021* (2024.01); *B64C 11/18* (2013.01); *B64C 27/467* (2013.01); *B64D 33/08* (2013.01); *B64U 20/94* (2023.01); *F04D 25/082* (2013.01); *F04D 29/384* (2013.01); *F04D 29/386* (2013.01); *F04D 29/5806* (2013.01); *F04D 29/5846* (2013.01); *H02K 9/06* (2013.01); *B64C 29/02* (2013.01); *B64D 27/31* (2024.01); *B64D 27/32* (2024.01); *B64U 50/19* (2023.01)

(58) Field of Classification Search
CPC .. F04D 29/384; F04D 29/386; F04D 29/5846; F04D 29/082; F04D 29/5806; F04D 19/00; F04D 19/02; F04D 25/082; B64C 11/18; B64C 27/467; B64C 29/00; B64C 29/0008; B64C 29/0016; B64C 29/0025; B64C 29/02; B64C 35/021; B64C 35/02; B64D 27/30; B64D 27/31; B64D 27/32; B64D 27/34; B64D 33/08; B64D 35/02; B64U 20/94; B64U 50/13; B64U 50/10; B64U 50/19; H02K 9/06
See application file for complete search history.

(56) References Cited

U.S. PATENT DOCUMENTS 3,670,190 A * 6/1972 Goebel .................... H02K 9/06
                                                                 310/83
4,231,706 A * 11/1980 Ueda ...................... F04D 29/30
                                                                 416/186 R (Continued)

FOREIGN PATENT DOCUMENTS

JP         2018-030384 A         3/2018

*Primary Examiner* — Christopher Verdier
(74) *Attorney, Agent, or Firm* — MATTINGLY & MALUR, PC

(57) ABSTRACT

Provided is an electric propulsion device 106 including a propeller 131 and a motor 121 for rotating the propeller, wherein the propeller includes a rotary boss 132 secured to a rotating shaft 123 of the motor, and blades 133 protruding radially outward from the rotary boss. Further, the blades include a base end portion with an airfoil continuously changing such that a trailing edge comes to be in parallel to the rotating shaft of the motor from a radially outer side to the rotary boss, in a vicinity of the rotary boss.

4 Claims, 10 Drawing Sheets

(51) Int. Cl.
  *B64D 33/08* (2006.01)
  *B64U 20/94* (2023.01)
  *B64U 50/19* (2023.01)
  *F04D 25/08* (2006.01)
  *F04D 29/38* (2006.01)
  *F04D 29/58* (2006.01)
  *H02K 9/06* (2006.01)

(56) References Cited

U.S. PATENT DOCUMENTS 5,066,196 A * 11/1991 Morofushi ............ F04D 29/325
                                                      416/241 A
5,320,493 A *  6/1994 Shih .................... F04D 29/386
                                                      416/223 R
8,128,369 B2 *  3/2012 Jarrah ................... F04D 29/188
                                                      416/185

* cited by examiner

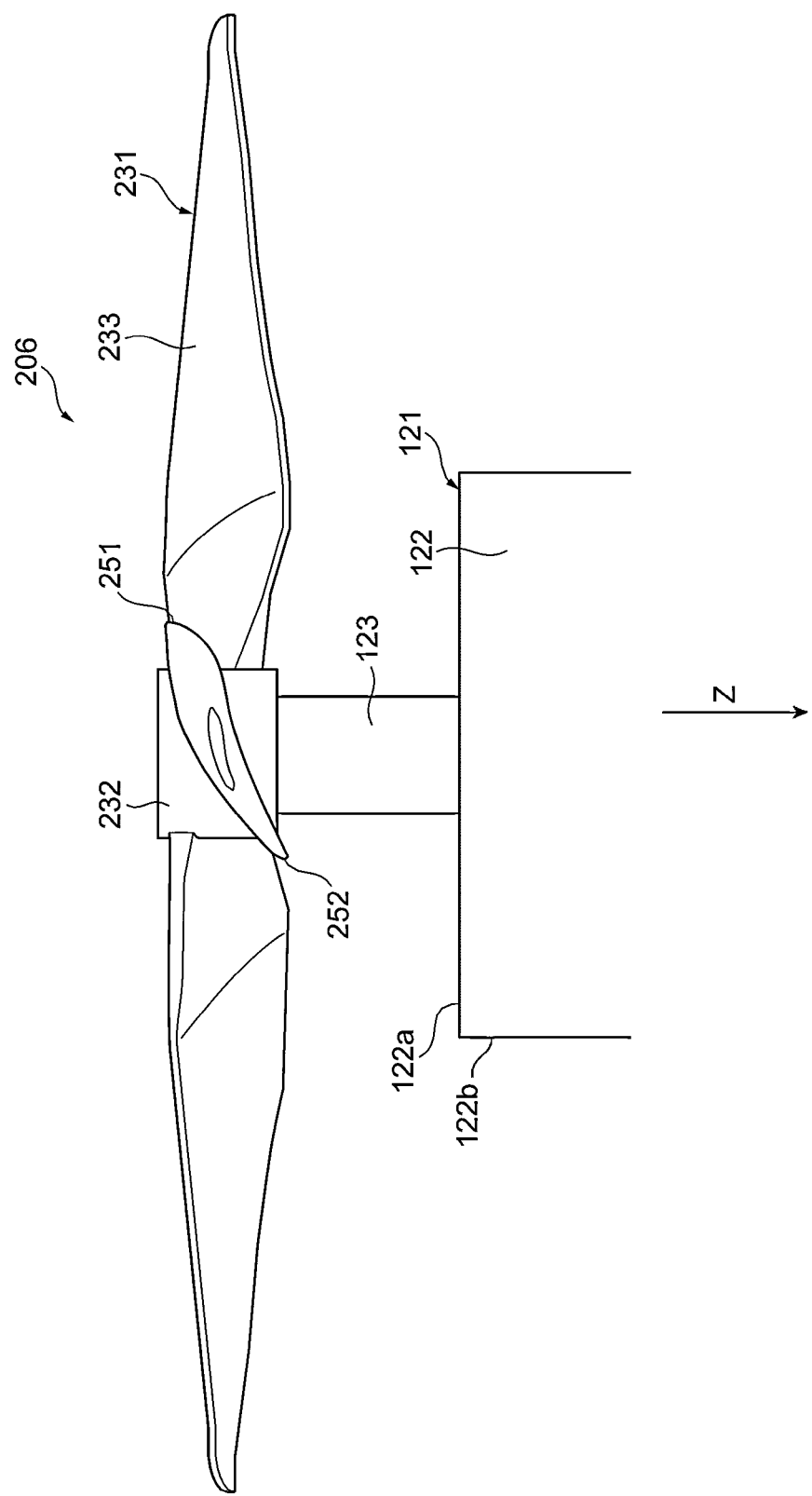

ELECTRIC PROPULSION DEVICE

CROSS-REFERENCE TO RELATED APPLICATION

The present application claims priority from Japanese application JP2023-115359, filed on Jul. 13, 2023, the content of which is hereby incorporated by reference into this application.

BACKGROUND OF THE INVENTION

1. Field of the Invention

The present invention relates to electric propulsion devices.

2. Description of the Related Art

In recent years, electric vertical taking-off and landing machines called small drones and flying cars have been increasingly expected to be implemented in society. JP 2018-30384 A describes the configuration of an electric vertical taking-off and landing machine capable of vertically taking off and landing from and to an air port by rotationally driving a propeller through a motor.

SUMMARY OF THE INVENTION

Such electric vertical taking-off and landing machines have the properties of responsively changing the attitude and quickly stabilizing the flight attitude. However, the motor generates heat when rotationally driving the propeller. In particular, in an electric vertical taking-off and landing machine, there is a tendency to increase the load on the propeller in order to obtain propulsion forces for causing the aircraft to float and fly, which tends to make the motor have a high temperature. If the motor generates heat and reaches a high temperature, this decreases the motor efficiency, which makes it difficult to cause the motor to exhibit desired performance, which may affect the reliability and safety of the aircraft.

Therefore, it is necessary to appropriately cool the motor. For example, if an oil-cooling or water-cooling mechanism is incorporated in order to cool the motor, this increases the weight of the machine body, which is not preferable for an aircraft. Therefore, in order to cool the motor in such an aircraft, there is a need for an air-cooling mechanism with high efficiency for effective utilization of airflows blown by a propeller or the like.

The present invention was made in view of the aforementioned points, and aims at providing an electric propulsion device capable of cooling a motor by air to increase the motor efficiency, thereby securing high reliability and safety of an aircraft.

An electric propulsion device according to the present invention for overcoming the aforementioned problem is an electric propulsion device including a propeller and a motor adapted to rotate the propeller, wherein
 the propeller comprises a rotary boss secured to a rotating shaft of the motor, and a blade protruding radially outward from the rotary boss, and
 the blade includes a base end portion with an airfoil continuously changing such that a trailing edge comes to be in parallel to the rotating shaft of the motor from a radially outer side to the rotary boss, in a vicinity of the rotary boss.

According to the present invention, it is possible to provide an electric propulsion device capable of cooling a motor by air to increase the motor efficiency, thereby securing high reliability and safety of an aircraft.

Further features relating to the present invention will become apparent from the description of the present specification and the accompanying drawings. Other problems, structures and effects than those described above will be clarified by the following description of embodiments.

BRIEF DESCRIPTION OF THE DRAWINGS

FIG. 7 is a front view illustrating a schematic configuration of an electric propulsion device in the comparative example;

DESCRIPTION OF THE PREFERRED EMBODIMENTS

Hereinafter, embodiments of the present invention will be described with reference to the drawings.

First Embodiment

Figure 1:
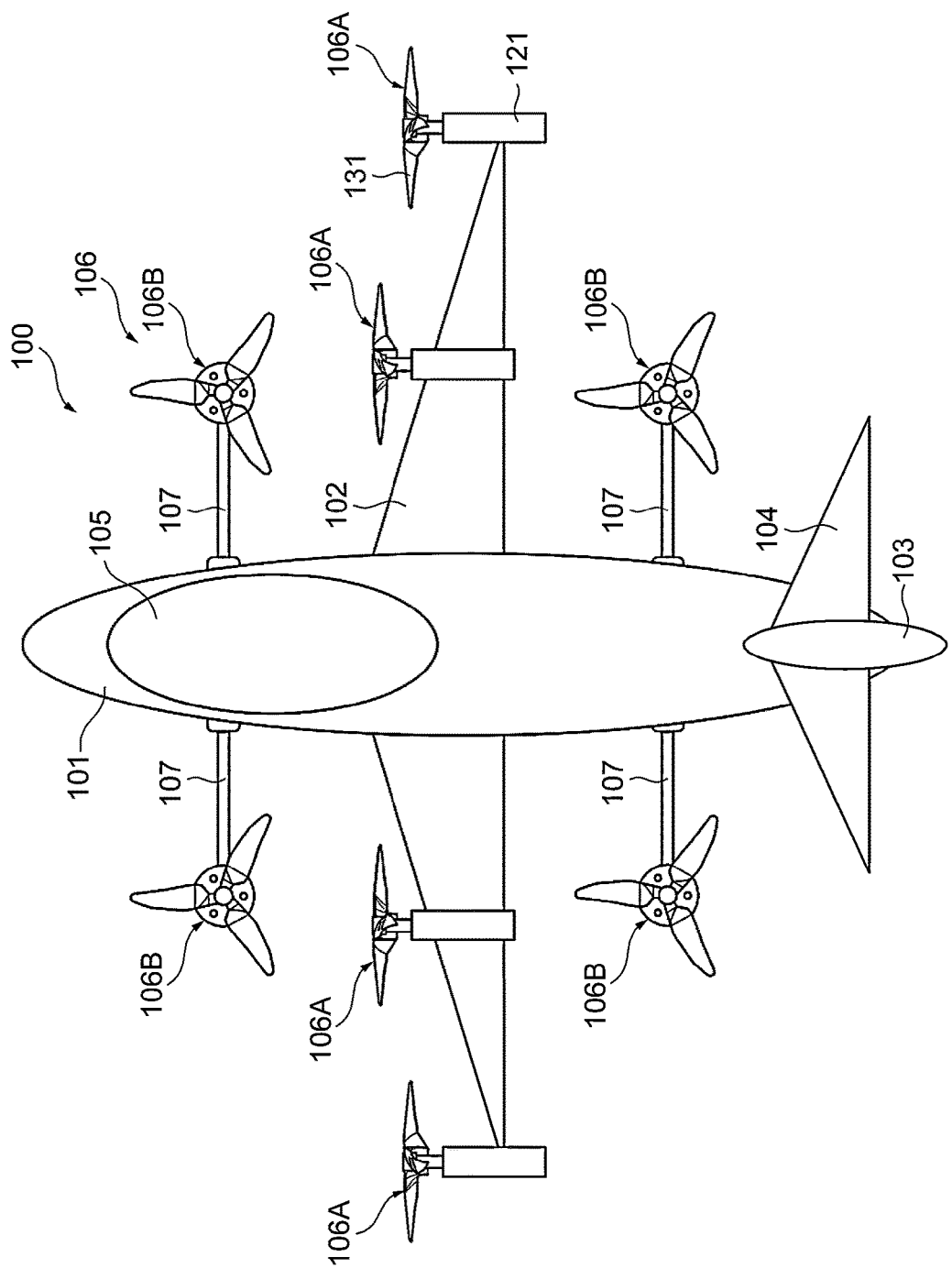
FIG. 1 is a plan view illustrating a schematic configuration of an aircraft including an electric propulsion device according to a first embodiment.

FIG. 1 is a plan view illustrating a schematic configuration of an aircraft including an electric propulsion device according to a first embodiment.

An aircraft 100 includes a fuselage 101, main wings 102, a vertical stabilizer 103, a horizontal stabilizer 104, a passenger compartment 105, and a plurality of electric propulsion devices 106.

The electric propulsion devices 106 include electric propulsion devices 106A for flying and electric propulsion devices 106B for floating. The electric propulsion devices 106A for flying are attached to the main wings 102, and the electric propulsion devices 106B for floating are attached to attachment arms 107 protruding from the fuselage 101.

The electric propulsion devices 106A for flying are horizontally attached in such a way as to be oriented forward of the aircraft 100. The electric propulsion devices 106B for floating are attached in such a way as to be oriented vertically upward of the aircraft 100.

The electric propulsion device 106 includes a motor 121 and a propeller 131, and is adapted to rotate the propeller 131 by the motor 121, thereby obtaining a thrust as a reaction force generated by air being accelerated and discharged by the propeller 131 rotating. The electric propulsion devices 106A for flying and the electric propulsion devices 160B for floating are installed at symmetrical positions and are adapted to rotate in symmetrical directions, in order to cancel the torques caused by the rotations of the propellers 131. Further, the propellers 131 are also oriented in opposite directions in accordance with the directions of rotations. The number of the electric propulsion devices 106 is an even number in consideration of the balance. In the present embodiment, the number of the electric propulsion devices 106A for flying is four, and the number of the electric propulsion devices 106B for floating is four. Note that the electric propulsion devices 106A for flying and the electric propulsion devices 106B for floating have the same configuration as each other, except that they are attached at different positions in different orientations.

Figure 2:
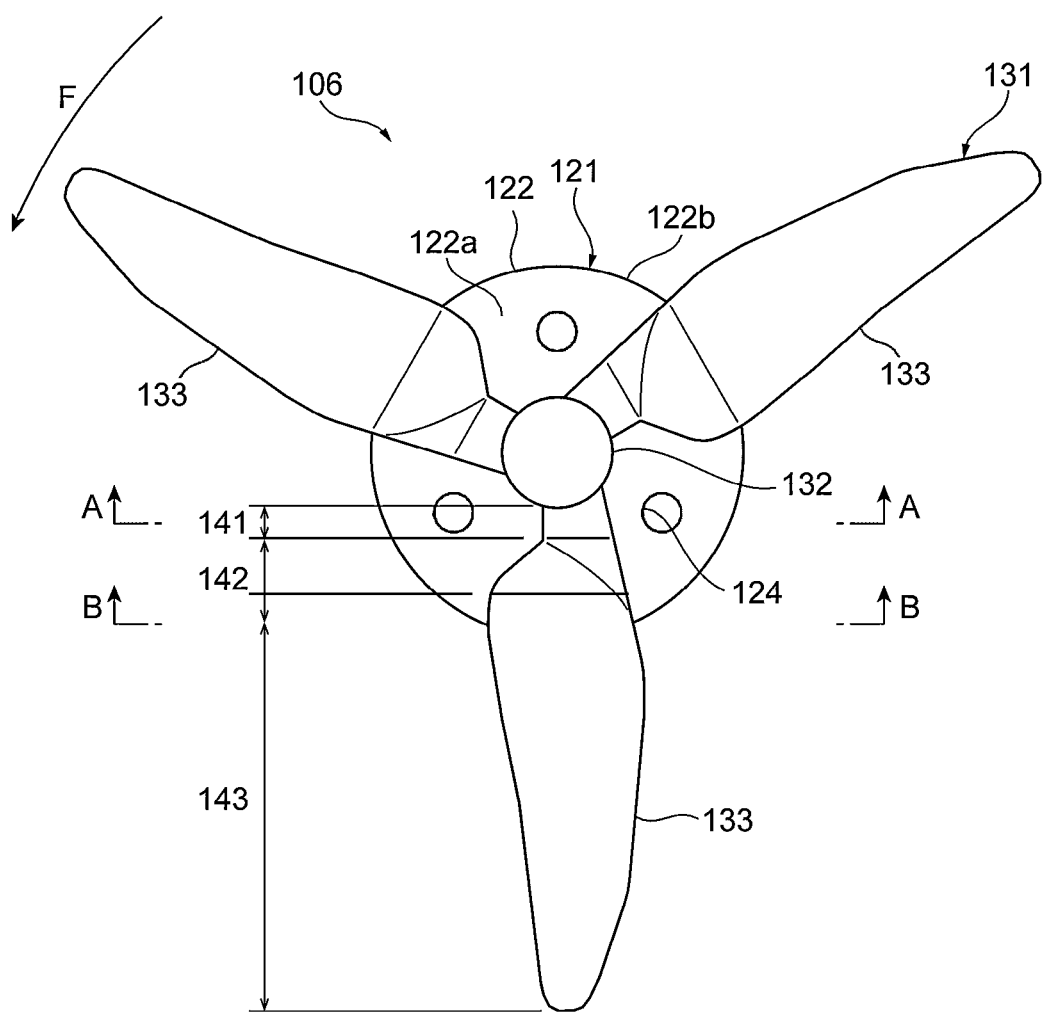
FIG. 2 is a plan view illustrating a schematic configuration of the electric propulsion device according to the first embodiment.
Figure 3:
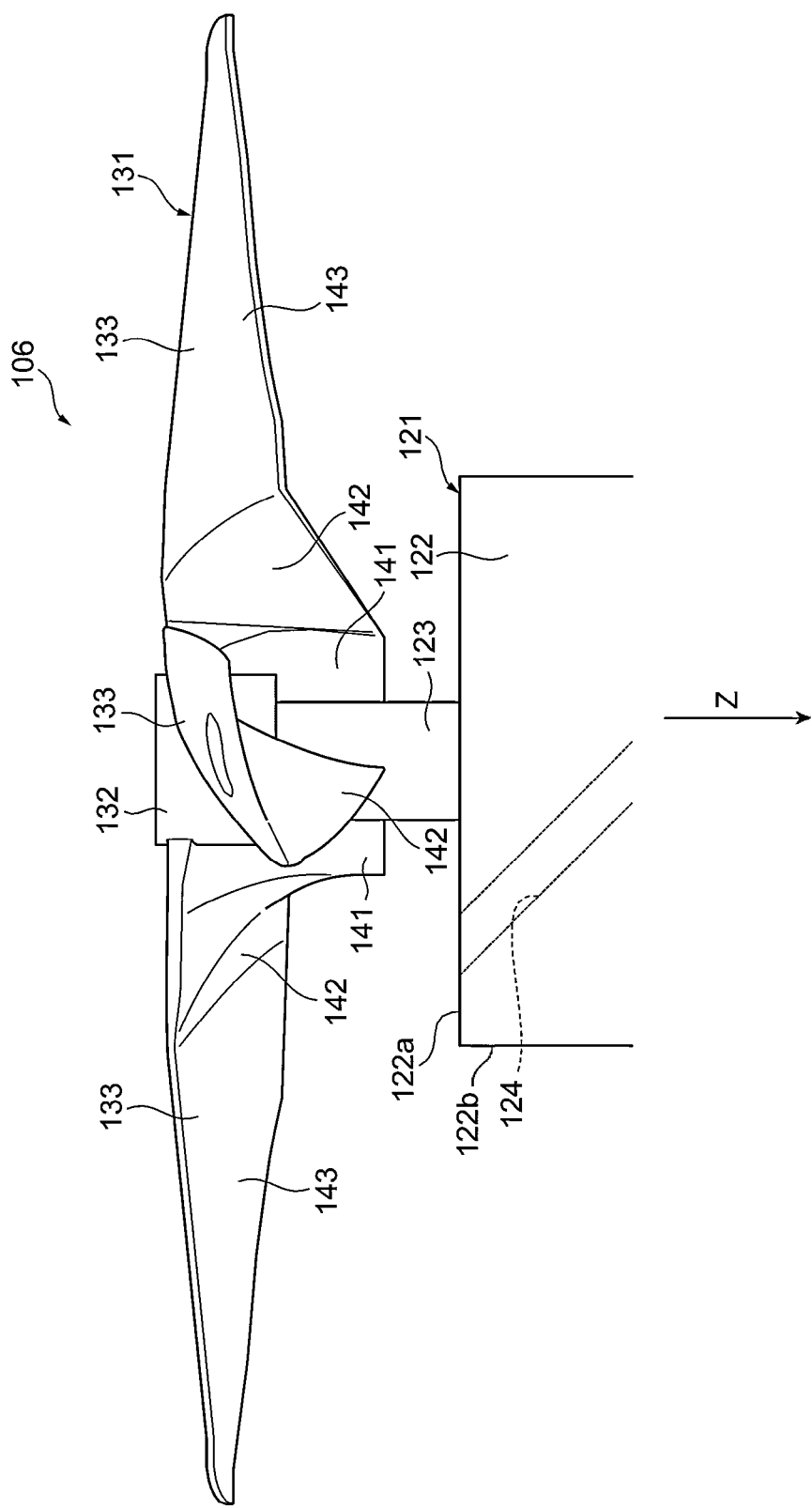
FIG. 3 is a front view illustrating a schematic configuration of the electric propulsion device according to the first embodiment.
Figure 4A:
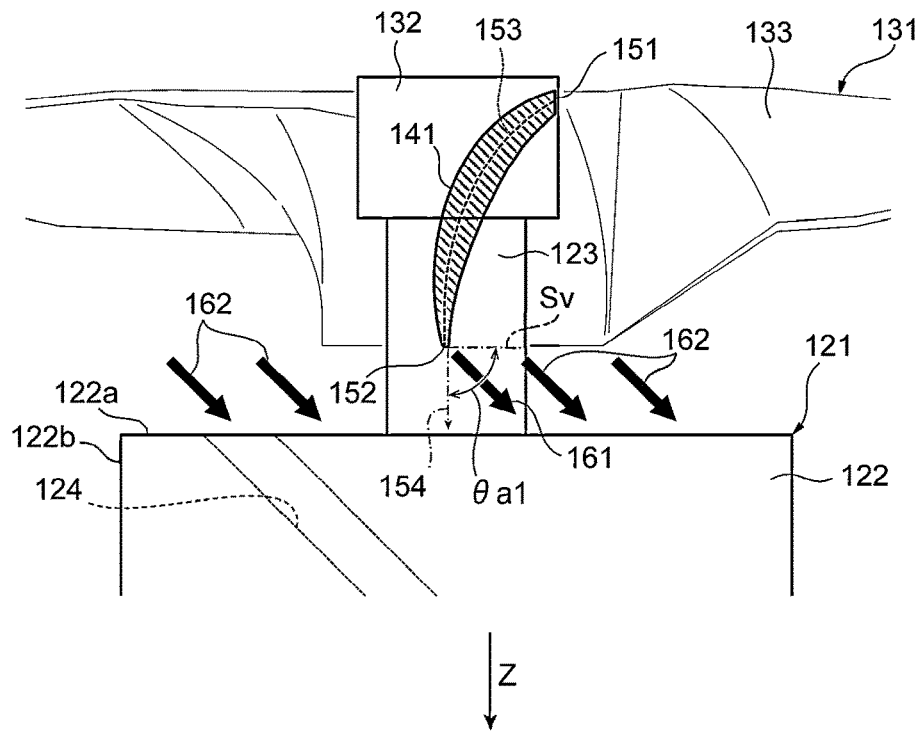
FIG. 4A is a cross-sectional arrow view taken along a line A-A in FIG. 2.
Figure 4B:
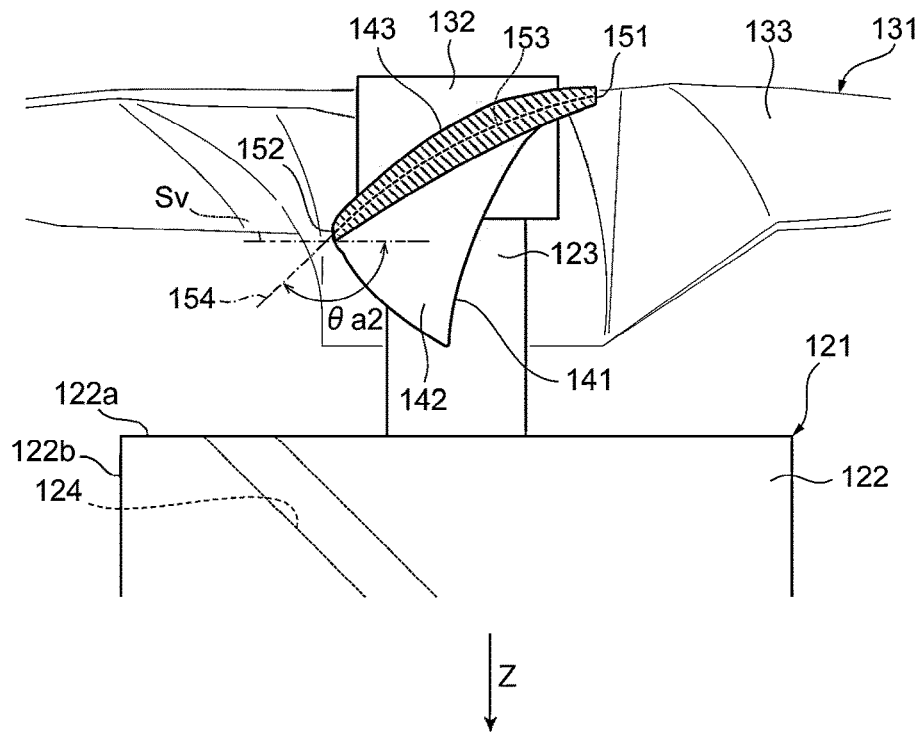
FIG. 4B is a cross-sectional arrow view taken along a line B-B in FIG. 2.

FIG. 2 is a plan view illustrating a schematic configuration of the electric propulsion device according to the first embodiment, FIG. 3 is a front view illustrating a schematic configuration of the electric propulsion device according to the first embodiment, FIG. 4A is a cross-sectional arrow view taken along the line A-A in FIG. 2, and FIG. 4B is a cross-sectional arrow view taken along the line B-B in FIG. 2.

The electric propulsion device 106 includes the motor 121 and the propeller 131. The motor 121 has a cylindrical housing 122, and a rotating shaft 123 protruding from an end surface (facing surface) 122a of the housing 122 on one side in the axial direction. The housing 122 rotatably supports the rotating shaft 123, and the rotating shaft 123 is rotated by a power source supplied from a motor driver (not illustrated) to the motor 121. FIGS. 2 to 4B illustrate an example of the electric propulsion device 106 structured to rotate in the counterclockwise direction F.

The propeller 131 includes a rotary boss 132 secured to the rotating shaft 123 of the motor 121, and a plurality of blades 133 radially projecting toward the radial outside from the rotary boss 132. In the present embodiment, the blades 133 are constituted by three blades having the same shape, and are arranged at equal angular intervals. The electric propulsion device 106 according to the present embodiment is characterized by the shape of the base end portion of the blade 133.

Here, a configuration in a comparative example will be described. In the description of the comparative example, the same constituents as those of the present embodiment will be denoted by the same reference characters, and will not be described in detail.

Figure 6:
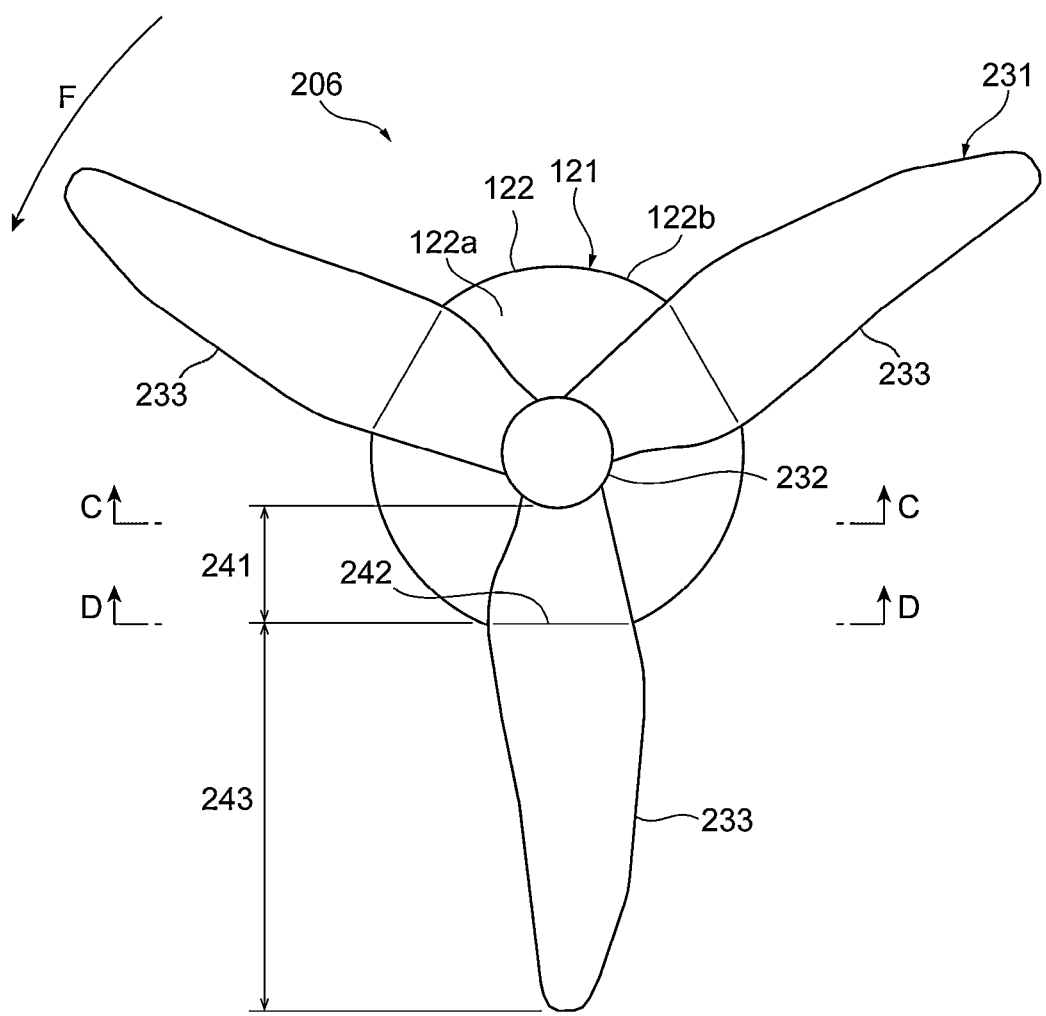
FIG. 6 is a plan view illustrating a schematic configuration of an electric propulsion device in a comparative example.
Figure 8A:
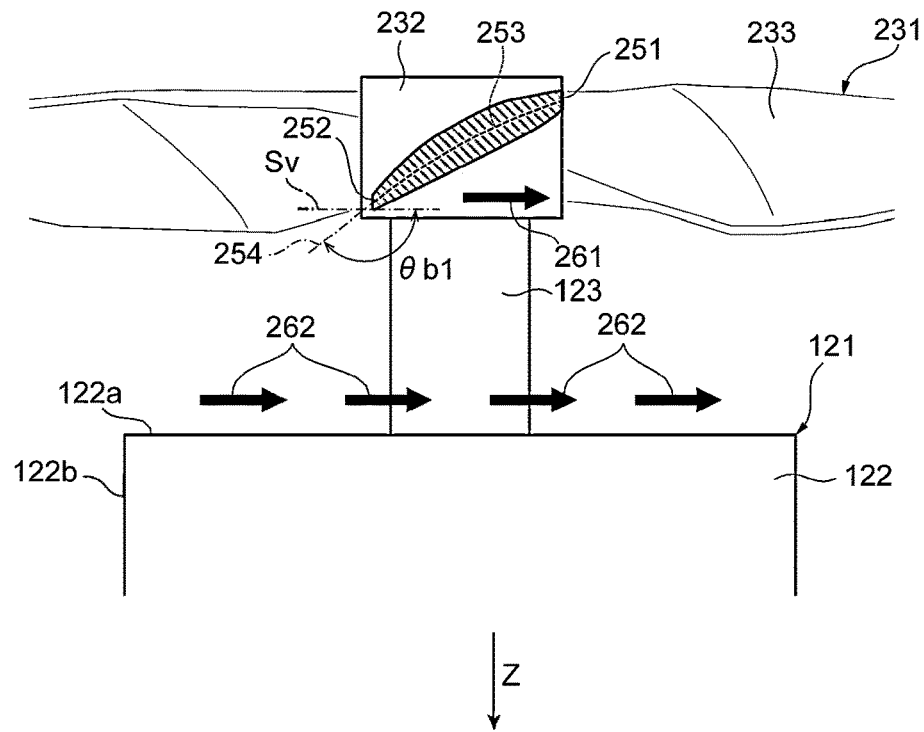
FIG. 8A is a cross-sectional arrow view taken along a line C-C in FIG. 6.
Figure 8B:
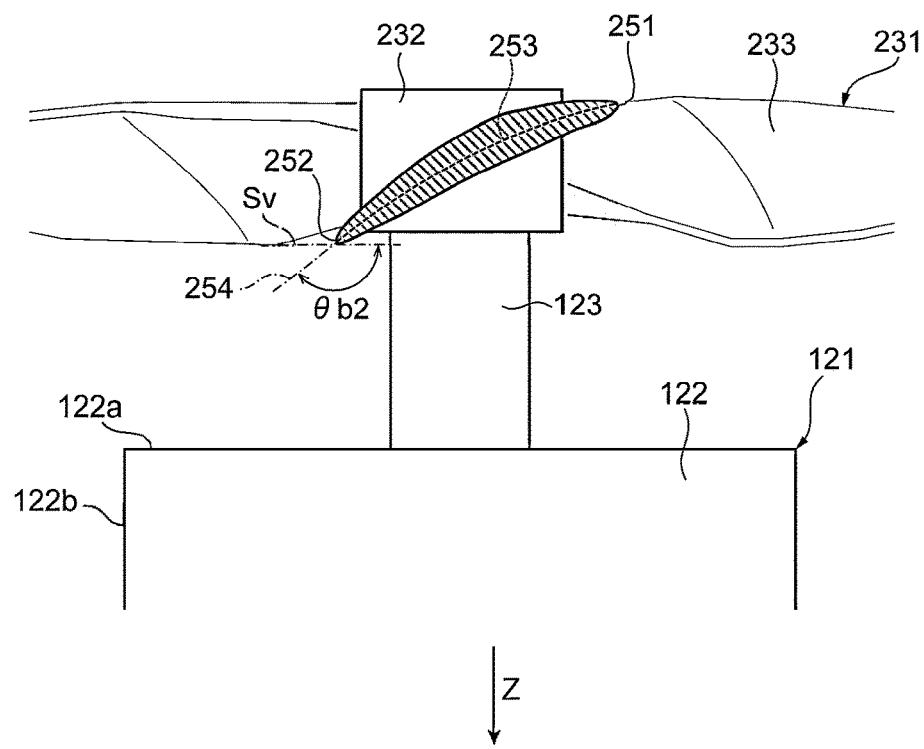
FIG. 8B is a cross-sectional arrow view taken along a line D-D in FIG. 6.

FIG. 6 is a plan view illustrating a schematic configuration of an electric propulsion device in a comparative example, FIG. 7 is a front view illustrating a schematic configuration of the electric propulsion device in the comparative example, FIG. 8A is a cross-sectional arrow view taken along the line C-C in FIG. 6, and FIG. 8B is a cross-sectional arrow view taken along the line D-D in FIG. 6.

The electric propulsion device 206 in the comparative example includes a rotary boss 232 secured to a rotating shaft 123 of a motor 121, and a plurality of blades 233 radially projecting toward the radial outside from the rotary boss 232.

The blade 233 has a shape in which the length of a straight line connecting a leading edge 251 and a trailing edge 252 of a blade cross section to each other, which is a chord, gradually increases from the root to the tip end of the blade 233, and the chord is maximized at substantially the same position as that of an outer peripheral surface 122b of the housing 122 of the motor 121, and further is narrowed again toward the tip end. The blade 233 has a base end portion 241 protruding from the rotary boss 232, and a distal end portion 243 protruding continuously from the base end portion 241.

In the base end portion 241 and the distal end portion 243 of the blade 233, the blade 233 has a discharge angle which is an obtuse angle larger than 90 degrees (deg), with respect to a virtual plane Sv orthogonal to the rotating shaft 123 of the motor 121. The discharge angle θb of the blade 233 is defined as an angle formed between the virtual plane Sv and a tangent line 254 at the trailing edge 252 of a center line 253 of the blade cross section of the blade 233.

The discharge angle θb in the base end portion 241 of the blade 233 is an angle θb1 as illustrated in FIG. 8A. The discharge angle θb at the boundary portion 242 between the base end portion 241 and the distal end portion 243, which forms a maximum chord of the blade 233, is an angle θb2 as illustrated in FIG. 8B.

The discharge angle θb1 in the base end portion 241 of the blade 233 and the discharge angle θb2 at the boundary portion 242 are substantially the same angle. In the present embodiment, the discharge angle θb in the distal end portion 243 is also the same angle as the discharge angle θb1 at the boundary portion 242. Namely, the blade 233 has a substantially constant discharge angle θb from the base end portion 241 to the distal end portion 243. The blade 233 rotates in the counterclockwise direction CCW to discharge airflows in the direction of an arrow Z, thereby obtaining a propulsion force.

Description of the electric propulsion device 106 according to the present embodiment will be given again.

The electric propulsion device 106 according to the present embodiment is different from the configuration of the aforementioned comparative example, in terms of the shapes of the base end portion 141 and an intermediate portion 142 of the blade 133 in the propeller 131.

The base end portion 141 of the blade 133 is configured so as to continuously change the airfoil such that the trailing edge 152 comes to be in parallel to the rotating shaft 123 of the motor 121, from the radially outer side to the rotary boss 132.

The base end portion 141 of the blade 133 has such a curved shape that its opposing surface facing the housing of the motor 121 is concavely curved, and the blade 133 has a discharge angle θa which is a substantially right angle, namely approximately 90 degrees (deg), with respect to a virtual plane Sv orthogonal to the rotating shaft 123 of the motor 121. The discharge angle θa of the blade 133 is defined as an angle formed between the virtual plane Sv and a tangent line 154 at the trailing edge 152 of a center line 153 of the blade cross section of the blade 133.

In the base end portion 141 of the blade 133, the length of a chord connecting the leading edge 151 and the trailing edge 152 to each other in a straight line is the same as a maximum chord length in the distal end portion 143 of the blade 133.

In the distal end portion 143 of the blade 133, the discharge angle θ*a* is an obtuse angle larger than 90 degrees (deg). The blade 133 includes an intermediate portion 142 that connects the base end portion 141 and the distal end portion 143 of the blade 133 to each other. The intermediate portion 142 constitutes a boundary portion between the base end portion 141 and the distal end portion 143, and has such a three-dimensional curved surface shape as to continuously change the discharge angle θa of the blade with respect to the virtual plane Sv from the base end portion 141 to the distal end portion 143.

When the propeller 131 is rotated, the base end portion 141 and the intermediate portion 142 of the blade 133 form a motor cooling region that generates air flows toward the end surface (facing surface) 122a of the housing 122 of the motor 121 by the discharge angle θa1 to generate motor cooling air flows for cooling the housing 122 of the motor 121.

Further, when the propeller 131 is rotated, the distal end portion 143 of the blade 133 forms a thrust securing region that generates, by the discharge angle θa2, air flows passing through positions radially outside the housing 122 of the motor 121 along the axial direction of the rotating shaft 123 of the motor 121 to generate a thrust.

Next, effects and advantages of the electric propulsion device 106 according to the present embodiment will be described in comparison with the comparative example.

In the configuration of the comparative example, as illustrated in FIG. 8A, when the propeller 231 is rotated, the blades 233 generate air flows, and the air flows are flows 261 having intense components in the rotational direction immediately below the blades in the side of the blade 233 closer to the motor 121. Shearing forces of the air flows 261 having intense components in the rotational direction generate flows 262 only in the rotational direction along the end surface 122a of the motor 121.

Figure 9:
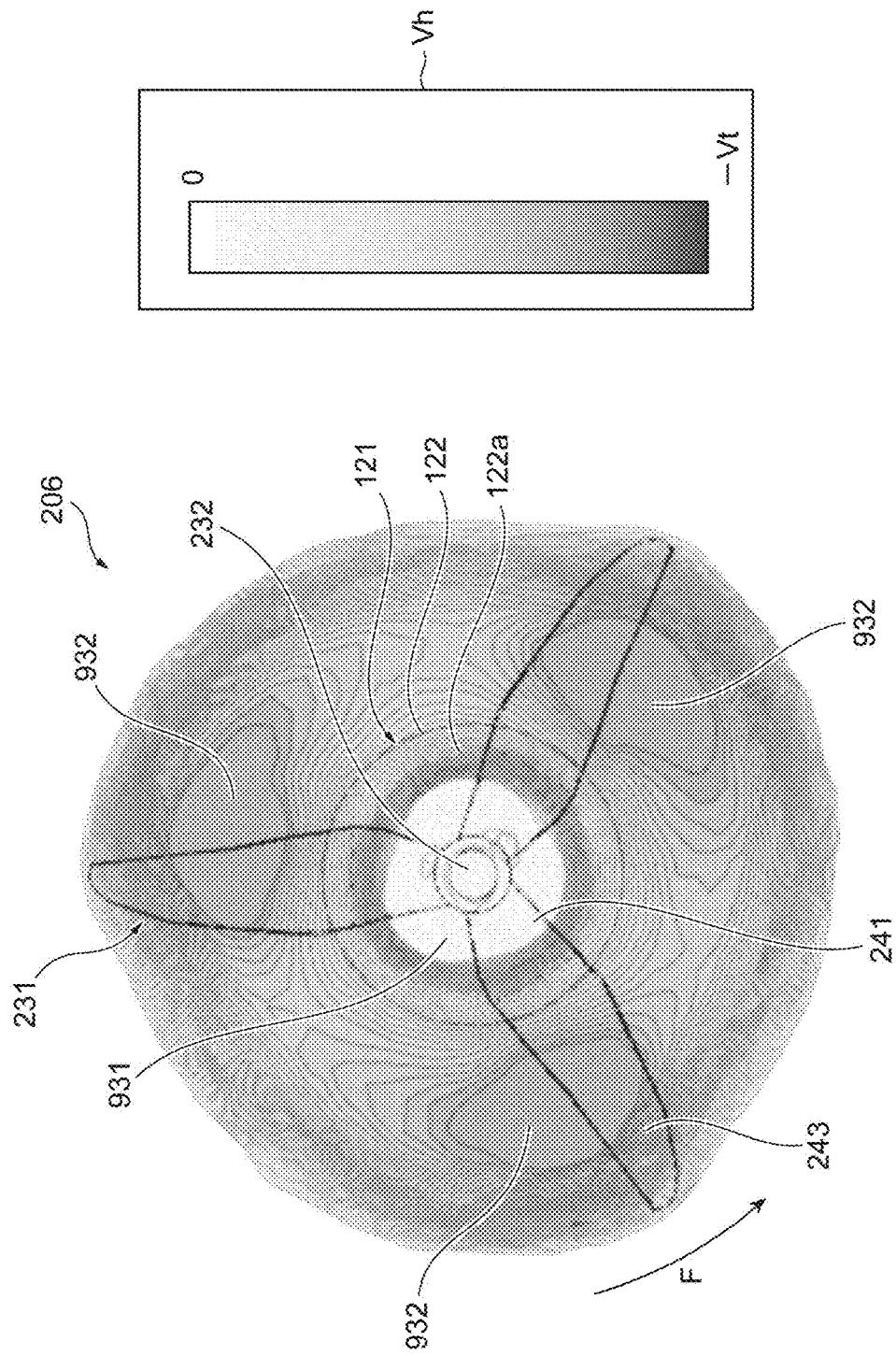
FIG. 9 is a view illustrating a flow velocity distribution of air flows generated by the electric propulsion device in the comparative example.

FIG. 9 illustrates a flow velocity distribution Vh of air flows in the direction of the rotating shaft in the end surface 122a of the motor 121 in the comparative example. In FIG. 9, regions of lighter colors indicate lower flow velocities, while regions of darker colors indicate higher flow velocities. The darkest regions indicate a flow velocity having the same value as a peripheral speed Vt, and flow velocities in the discharging direction are defined as those having negative values. As illustrated in FIG. 9, it can be seen that, in regions 932 immediately below the distal end portions 243 of the blades 233 being rotated, there are larger flow velocities, thereby generating a thrust, as in the regions 932.

On the other hand, it can be seen that there is a flow velocity of substantially 0 in a region 931 immediately below the base end portions 241 of the blades 233 being rotated. Accordingly, there is hardly generated any air flow toward the end surface 122a of the motor 121, which may cause the motor 121 to have a high temperature due to insufficient cooling. This reveals that there is a need for air flows in the direction of the rotating shaft toward the end surface 122a of the motor 121, in order to cool the motor 121.

In the configuration according to the present embodiment, as illustrated in FIG. 4A, when the blades 133 are rotated, the blades 133 generate air flows, and the air flows are gently diverted, since the chord in the base end portion 141 is longer than that of the comparative example. Furthermore, since the discharge angle θa is approximately 90 degrees (deg) in the base end portions 141 of the blades 133, air flows 161 are flows not only being in the rotational direction as in the comparative example, but also being inclined toward the end surface 122a of the motor 121. This causes air flows 162 in an oblique direction to impinge on the end surface 122a of the motor 121.

Figure 5:
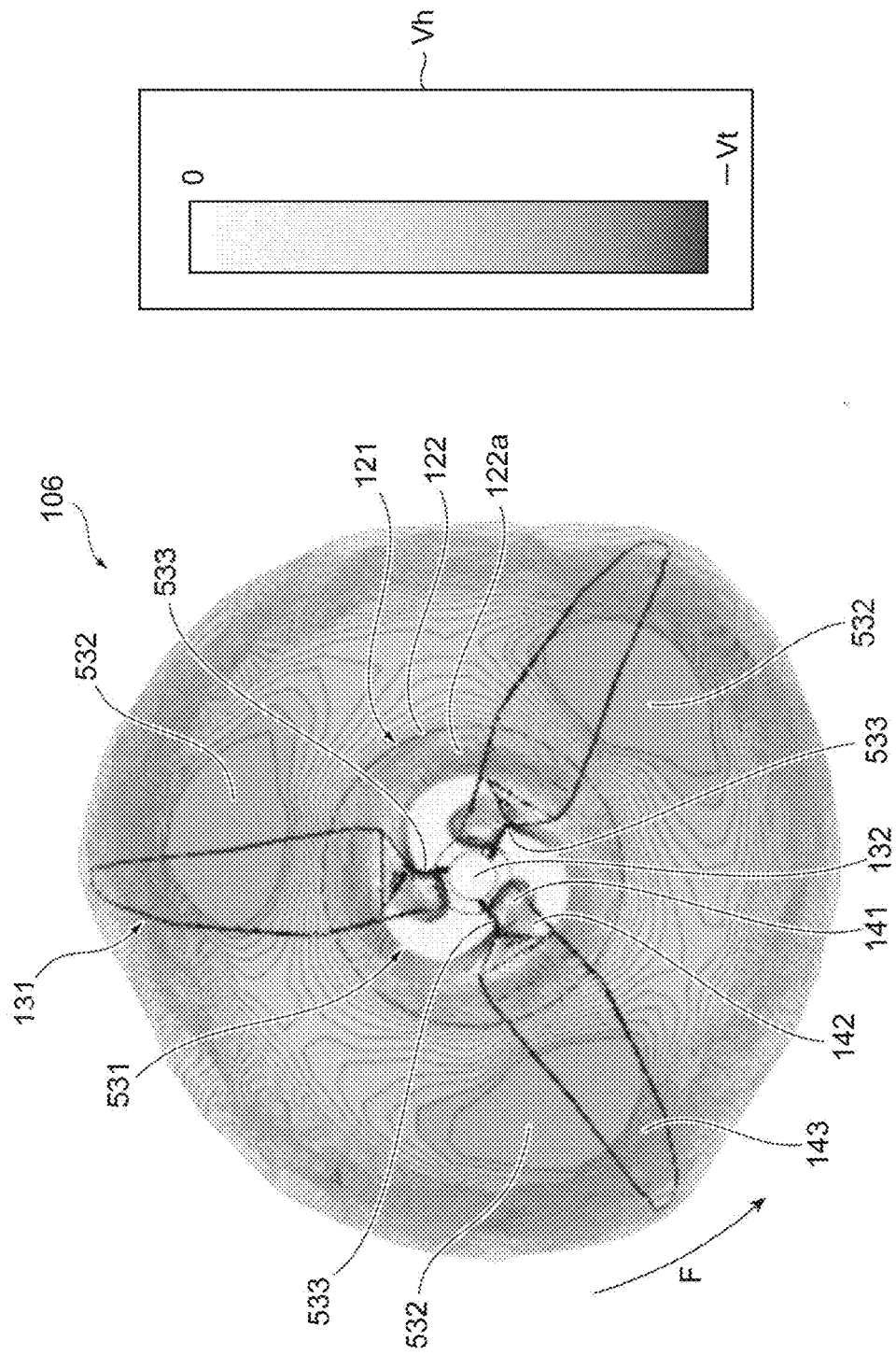
FIG. 5 is a view illustrating a flow velocity distribution of air flows generated by the electric propulsion device according to the first embodiment.

FIG. 5 illustrates a flow velocity distribution Vh of air flows in the direction of the rotating shaft, in the end surface 122a of the motor 121 according to the present embodiment. In FIG. 5, similarly to in FIG. 9, regions of lighter colors indicate lower flow velocities, while regions of darker colors indicate higher flow velocities.

As illustrated in FIG. 5, similarly to in the comparative example, it can be seen that, in regions 532 immediately below the distal end portions 143 of the blades 133, there are larger flow velocities, thereby generating a thrust, as in the regions 532. On the other hand, unlike in the comparative example, in a region 531 immediately below the base end portions 141 of the blades 133 being rotated, there are larger flow velocities in the rear side in the direction of the rotating shaft of the motor 121, and there are generated air flows 533 flowing in the direction of the rotating shaft of the motor 121 toward the end surface 122a of the motor 121, which indicates that the region 531 is a motor cooling region. Accordingly, cooling air flows can be directed to the end surface (facing surface) 122a of the motor 121, thereby cooling the motor 121 through air.

Further, in the present embodiment, the housing 122 of the motor 121 is provided with a plurality of opening holes 124. The plurality of opening holes 124 are formed in the end surface 122a of the housing 122 of the motor 121, to which the base end portions 141 of the blades 133 are faced. The plurality of opening holes 124 are inclined with respect to the axial direction of the rotating shaft 123 of the motor 121 and is extended within the housing 122 in a direction orthogonal to the curved surfaces of the blades 133 so as to be along the direction of air flows 162. This enables actively flowing the air flows 162 generated by the base end portions 141, as cooling air flows, into the housing 122 of the motor 121, thereby effectively cooling the motor.

As illustrated in FIG. 4A, the electric propulsion device 106 according to the present embodiment is configured such that the discharge angle θa in the base end portions 141 of the blades 133 is approximately 90 degrees (deg). The airfoil formed in this way may raise a concern about difficulty in obtaining a propulsion force by the propeller 131. However, in the case of the present embodiment, the propulsion force was decreased by about 4%, which was a sufficiently small value.

The base end portions 141 of the blades 133 according to the present embodiment are disposed at such positions as to face the end surface 122a of the motor 121, and these positions are originally places where the motor 121 obstructs air flows and, also, these positions are only in the vicinity of the rotary boss 132 having a lower peripheral speed. Thus, it is considered that the influence on the propulsion force is suppressed. Therefore, the trade-off between propulsion forces and ensuring of cooling performance is overcome. Furthermore, cooling the motor 121 enables generation of larger torque, which facilitates generation of propulsion forces.

Although, in the present embodiment, the length of the chord in the base end portion 141 is made to be a maximum chord length of the blade 133, the length of the chord in the base end portion 141 may be smaller than the maximum chord length. When the length of the chord in the base end portion 141 is made smaller, it is possible to ensure a larger distance between the trailing edge 152 of the base end portion 141 and the end surface 122a of the motor 121, which avoids the collision between the base end portion 141 and the motor 121, thereby improving the safety guarantee during rotation thereof.

However, the diversion of air flows by the base end portion 141 is weakened to deteriorate the effect of cooling air flows. Therefore, the minimum value of the length of the chord in the base end portion 141 is made to be equal to the length of the chord in the distal end portion 143.

The discharge angle θa1 of the base end portion 141 is preferably between 100 degrees (deg) and 90 degrees (deg), and particularly preferably 90 degrees (deg). Conventionally, the discharge angle of the base end portion is changed from the rotary boss toward the outer periphery, in some cases, in order to match it with a higher peripheral speed of the distal end portion in the outer peripheral side, but the discharge angle is an obtuse angle of 130 degrees (deg) or more, for example, the electric propulsion device 106 according to the present embodiment is characterized in that the airfoil of the blades 133 is discontinuously changed in the radial direction, which enables effectively generating cooling air flows for cooling the motor.

Further, the length of the base end portion 141 is preferably ½ to ½₀ of the length of the distal end portion 143 for securing the thrust. On the other hand, it is desirable that the length of the intermediate portion 142 is about ⅕ of the length of the distal end portion 143 for mildly changing the airfoil or is 0.

In the former case where the length of the intermediate portion 142 is such that the airfoil is mildly changed, the inclination is gently changed up to the base end portion 141, which prevents separation of the blade, thereby providing advantages in terms of both improving the cooling performance and securing the propulsion force. In the latter case where the length of the intermediate portion 142 is 0, the length of the base end portion 141 can be made larger by an amount corresponding thereto, thereby securing a larger amount of cooling air flows. Alternatively, the length of the distal end portion 143 can be made larger, in order to ensure a larger thrust.

As described above, with the electric propulsion device 106 according to the present embodiment, it is possible to cool the motor 121 by air to increase the motor efficiency, thereby ensuring higher reliability and safety of the aircraft.

Second Embodiment

Next, a second embodiment of the present invention will be described. The present embodiment is characterized in that a propeller 231 is provided, at its tip end, with a cap for blowing air flows. Note that constituents similar to those in the first embodiment will be denoted by the same reference numerals, and will not be described in detail.

Figure 10:
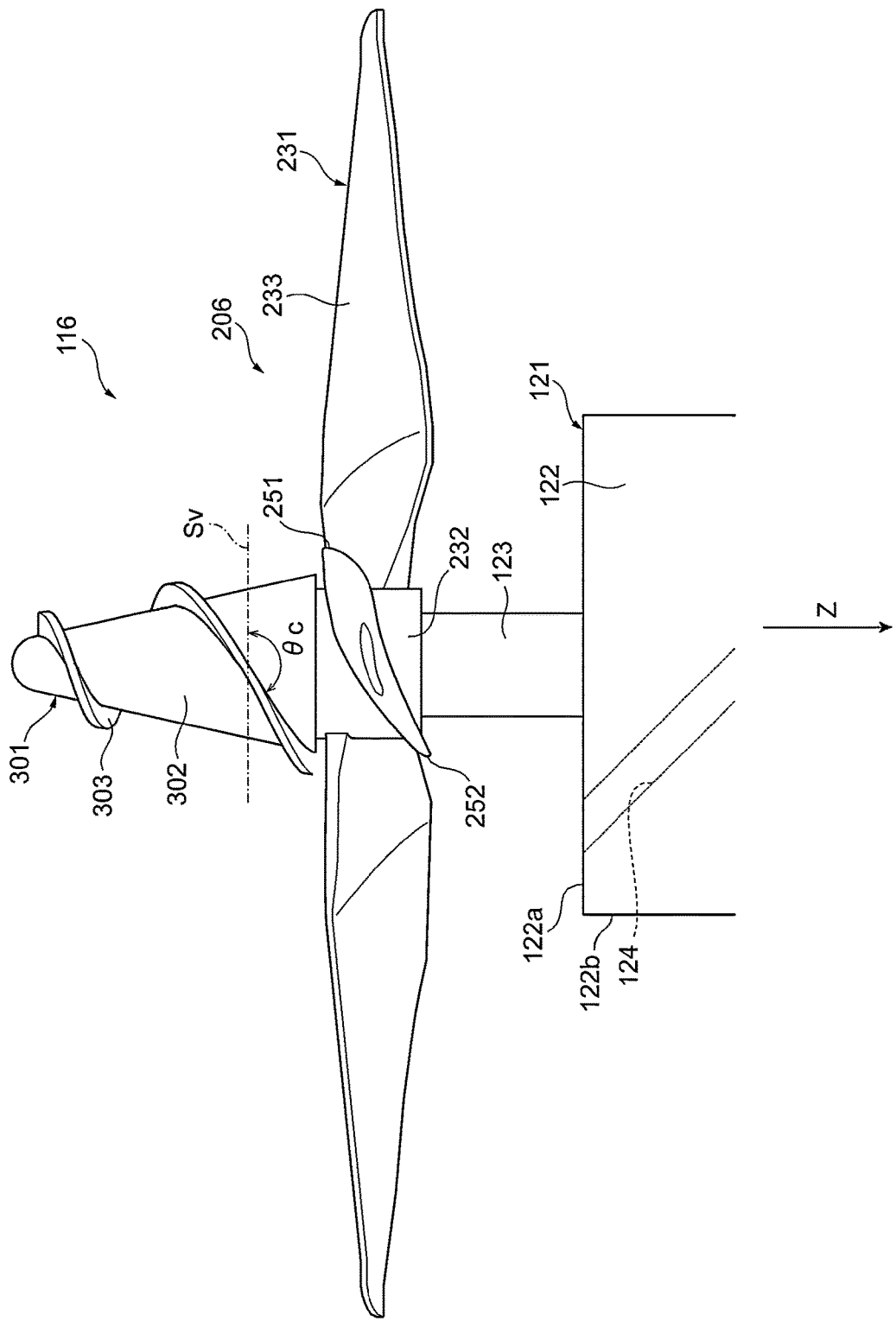
FIG. 10 is a front view illustrating a schematic configuration of an electric propulsion device according to a second embodiment.

FIG. 10 is a front view illustrating a schematic configuration of an electric propulsion device according to the second embodiment.

The electric propulsion device 116 according to the present embodiment includes a cap 301 for blowing air flows at the tip end of a rotary boss 232. The cap 301 includes a body portion 302 having a conical shape and gradually decreasing in diameter in the direction getting away from the rotary boss 232 along the direction of the rotating shaft, and a guide 303 protruding spirally from an outer peripheral surface of the body portion 302. The cap 301 is configured similarly to an auxiliary device placed in front of the main machine, which is called an inducer, in a fluid mechanical sense.

The guide 303 forms an inclination angle θc with a virtual plane Sv, wherein the inclination angle θc is smaller than a discharge angle θb of the blades 233. The body portion 302 is secured to the rotary boss 232 in the propeller 231 and is rotated integrally with the propeller 231. The guide 303 generates air flows in the Z direction along the rotating shaft toward the end surface 122a of the motor 121. The air flows can effectively cool the motor 121.

Although the embodiments of the present invention have been described in detail above, the present invention is not limited to the aforementioned embodiments, and various design changes can be made thereto without departing from the gist of the present invention described in the claims. For example, the aforementioned embodiments have been described in detail, for the purpose of explaining the present invention in such a way as to facilitate understanding the present invention, and the present invention is not necessarily limited to structures including all the described structures. Further, a structure according to a certain embodiment can be partially replaced with a structure according to another embodiment and, also, a structure according to a certain embodiment can be additionally provided with a structure according to another embodiment. Further, a structure according to each embodiment may be partially eliminated, provided with other additional structures or replaced with other structures.

What is claimed is:

1. An electric propulsion device comprising:
a propeller; and
a motor adapted to rotate the propeller,
wherein the propeller comprises a rotary boss secured to a rotating shaft of the motor, and a blade protruding radially outward from the rotary boss,
wherein the blade includes a base end portion with an airfoil continuously changing such that a trailing edge comes to be in parallel to the rotating shaft of the motor from a radially outer side to the rotary boss, in a vicinity of the rotary boss,
wherein, in an axial direction of the rotating shaft, the motor is disposed below the trailing edge of the base end portion such that an upper end portion of the motor faces the trailing edge of the base end portion,
wherein the base end portion of the blade has a curved surface having an opposing surface facing a housing of the motor and being concavely curved, and the blade forms a discharge angle which is a right angle with respect to a virtual plane orthogonal to the rotating shaft of the motor, and
wherein the motor is provided with a plurality of opening holes in a facing surface of the housing of the motor to which the base end portion of the blade faces, and
the plurality of opening holes are inclined with respect to an axial direction of the rotating shaft and is extended in a direction orthogonal to the curved surface.

2. The electric propulsion device according to claim 1, wherein a length of a chord connecting a leading edge and the trailing edge of the base end portion of the blade to each other in a straight line is the same as a length of a maximum chord of a distal end portion of the blade.

3. The electric propulsion device according to claim 1, wherein the blade includes an intermediate portion connecting the base end portion and a distal end portion to each other, and
the intermediate portion has such a three-dimensional curved surface shape as to continuously change the discharge angle of the blade with respect to the virtual plane, from the base end portion to the distal end portion.

4. The electric propulsion device according to claim 1, wherein, in the axial direction, the trailing edge of the base end portion extends further toward the motor than the rotary boss.

* * * * *